(12) United States Patent
Oh et al.

(10) Patent No.: US 10,543,740 B2
(45) Date of Patent: Jan. 28, 2020

(54) LOCKUP CLUTCH FOR POWERSPLIT HYBRID TRANSMISSION (71) Applicant: Ford Global Technologies, LLC, Dearborn, MI (US)

(72) Inventors: David Gon Oh, Ann Arbor, MI (US); David Allen Janson, Plymouth, MI (US); Gregory Daniel Goleski, Rochester Hills, MI (US); Matthew David Hammond, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 245 days.

(21) Appl. No.: 15/666,157

(22) Filed: Aug. 1, 2017

(65) Prior Publication Data
US 2019/0039449 A1    Feb. 7, 2019

(51) Int. Cl.
B60K 6/547     (2007.10)
F16H 3/66      (2006.01)
B60K 6/365     (2007.10)
B60K 6/387     (2007.10)
B60K 6/445     (2007.10)
B60K 6/48      (2007.10)
F16H 3/44      (2006.01)

(52) U.S. Cl.
CPC ............. B60K 6/547 (2013.01); B60K 6/365 (2013.01); B60K 6/387 (2013.01); B60K 6/445 (2013.01); F16H 3/66 (2013.01); B60K 2006/4816 (2013.01); B60Y 2200/92 (2013.01); B60Y 2400/42 (2013.01); B60Y 2400/73 (2013.01); F16H 2003/445 (2013.01); F16H 2200/0043 (2013.01); F16H 2200/2007 (2013.01); F16H 2200/2043 (2013.01); Y10S 903/911 (2013.01); Y10S 903/914 (2013.01); Y10S 903/919 (2013.01)

(58) Field of Classification Search
CPC .......... B60K 6/365; B60K 6/387; B60K 6/40; B60K 6/445; B60K 6/547; B60K 2006/4816; F16H 3/66; F16H 2003/445; F16H 2200/0043; F16H 2200/2007; F16H 2200/204; B60Y 2200/92; B60Y 2400/42; B60Y 2400/73; Y10S 903/914; Y10S 903/911; Y10S 903/919
See application file for complete search history.

(56) References Cited

U.S. PATENT DOCUMENTS

7,223,200 B2    5/2007   Kojima et al.
7,255,186 B2    8/2007   Wakuta et al.
7,632,201 B2   12/2009   Takami et al.
8,535,201 B2    9/2013   Kuang et al.
(Continued)

Primary Examiner — Jacob S. Scott
Assistant Examiner — Lori Wu
(74) Attorney, Agent, or Firm — David B. Kelley; Brooks Kushman P.C.

(57) ABSTRACT

A powertrain includes an engine and an electric machine. The powertrain further includes a planetary gearset including a a first rotatable element fixedly coupled to an engine crankshaft, a second rotatable element fixedly coupled to the electric machine, and a third rotatable element driveably connected to an intermediate shaft. The powertrain further includes a lockup clutch configured to selectively couple two of the first rotatable element, the second rotatable element, and the third rotatable element.

16 Claims, 3 Drawing Sheets (56) References Cited

U.S. PATENT DOCUMENTS

| | | |
|---|---|---|
| 8,734,287 B2 | 5/2014 | Kim et al. |
| 9,108,501 B2 | 8/2015 | Ortmann et al. |
| 9,108,505 B2 | 8/2015 | Supina |
| 9,360,107 B2 | 6/2016 | Pietron et al. |
| 9,643,481 B2 | 5/2017 | Goleski et al. |
| 2006/0148604 A1* | 7/2006 | Raghavan ............. B60K 6/365 475/5 |
| 2006/0148605 A1* | 7/2006 | Raghavan ............. F16H 3/728 475/5 |
| 2006/0189427 A1* | 8/2006 | Raghavan ............. B60K 6/365 475/5 |
| 2007/0021258 A1* | 1/2007 | Conlon ................. B60K 6/365 475/5 |
| 2007/0111837 A1* | 5/2007 | Raghavan ............. B60K 6/365 475/5 |
| 2007/0129203 A1* | 6/2007 | Raghavan ............. F16H 3/728 475/275 |
| 2007/0225097 A1* | 9/2007 | Raghavan ............. B60K 6/365 475/5 |

\* cited by examiner

LOCKUP CLUTCH FOR POWERSPLIT HYBRID TRANSMISSION

TECHNICAL FIELD

This disclosure relates to the field of automatic transmissions for motor vehicles. More particularly, the disclosure pertains to an arrangement of gears, clutches, motors, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

Hybrid electric transmissions further reduce fuel consumption by including one or more reversible electric machines and some type of electrical energy storage such as a battery. Hybrid electric transmissions improve fuel efficiency is several ways. Most internal combustion engines are most efficient when operated at relatively high power settings. A hybrid electric transmission permits operating the engine part of the time at a higher power level than needed for propulsion while storing the excess power in the battery. Then, at other times, the engine is shut off and the vehicle is propelled using the stored energy. Although the engine generates the same amount of total energy, it operates at a higher average efficiency. Also, when the brakes are applied, the reversible electrical machine may capture the vehicle kinetic energy and store it in the battery for later use for propulsion. When the vehicle is stationary and therefore does not require propulsion, the engine can be shut off to eliminate the fuel that would otherwise be used to maintain an idle speed. The electric motor provides the ability to propel the vehicle with the engine off and to rapidly restart the engine when necessary.

SUMMARY

In at least one approach, a powertrain is provided. The powertrain may include an engine and an electric machine. The powertrain may further include a planetary gearset including a first rotatable element fixedly coupled to an engine crankshaft, a second rotatable element fixedly coupled to the electric machine, and a third rotatable element driveably connected to an intermediate shaft. The powertrain may further include a lockup clutch configured to selectively couple two of the first rotatable element, the second rotatable element, and the third rotatable element.

The first rotatable element may be a planetary carrier assembly. The second rotatable element may be a sun gear. The third rotatable element may be a ring gear. In one example, the lockup clutch is configured to selectively couple the planetary carrier assembly to the ring gear. In another example, the lockup clutch is configured to selectively couple the sun gear to the ring gear. In still another example, the lockup clutch is configured to selectively couple the sun gear to the planetary carrier assembly.

The powertrain may further include a second electric machine driveably connected to the intermediate shaft. The powertrain may also include a gearing assembly configured to alternately selectively establish a plurality of proportional speed relationships between the intermediate shaft and an output shaft. The plurality of proportional speed relationships may include four positive speed relationships and one negative speed relationship.

In at least one approach, the gearing assembly includes a second planetary gearset having a second sun gear selectively coupled to the intermediate shaft, a second planetary carrier assembly, and a second ring gear fixedly coupled to the output shaft. In this approach, the gearing assembly may further include a third planetary gearset having a third sun gear fixedly coupled to the intermediate shaft, a third planetary carrier assembly fixedly coupled to the output shaft, and a third ring gear selectively coupled to the second planetary carrier assembly. The gearing assembly may further include a first brake configured to selectively hold the second sun gear against rotation, and a second brake configured to selectively hold the second planetary carrier assembly against rotation. The gearing assembly may further include a clutch configured to selectively couple the intermediate shaft to the second planetary carrier assembly.

In at least one approach, the gearing assembly includes a second planetary gearset having a second sun gear selectively coupled to the intermediate shaft, a second planetary carrier assembly selectively coupled to the intermediate shaft, and a second ring gear fixedly coupled to the output shaft. In this approach, the gearing assembly may further include a third planetary gearset having a third sun gear selectively coupled to the intermediate shaft, a third planetary carrier assembly fixedly coupled to the output shaft, and a third ring gear fixedly coupled to the second planetary carrier assembly. The gearing assembly may further include a first brake configured to selectively hold the second sun gear against rotation and a second brake configured to selectively hold the second planetary carrier assembly against rotation. The gearing assembly may further include a clutch configured to selectively couple the intermediate shaft to the second planetary carrier assembly.

In at least one approach, the gearing assembly includes a second planetary gearset having a second sun gear selectively coupled to the intermediate shaft, a second planetary carrier assembly, and a second ring gear selectively coupled to the intermediate shaft. In this approach, the gearing assembly may further include a third planetary gearset having a third sun gear fixedly coupled to the second sun gear, a third planetary carrier assembly fixedly coupled to the output shaft, and a third ring gear fixedly coupled to the second planetary carrier assembly. The gearing assembly may further include a first brake configured to selectively hold the second ring gear against rotation, and a second brake configured to selectively hold the third ring gear against rotation. The gearing assembly may further include a clutch configured to selectively couple the intermediate shaft to the second planetary carrier assembly.

In at least one approach, the gearing assembly includes a second planetary gearset having a second sun gear selectively coupled to the intermediate shaft, a second planetary carrier assembly selectively coupled to the intermediate shaft, and a second ring gear fixedly coupled to the output shaft. In this approach, the gearing assembly may further include a third planetary gearset having a third sun gear, a third planetary carrier assembly fixedly coupled to the output shaft, and a third ring gear fixedly coupled to the second planetary carrier assembly. The gearing assembly may further include a first brake configured to selectively hold the second planetary carrier assembly against rotation, and a second brake configured to selectively hold the third sun gear against rotation. The gearing assembly may further include a third brake configured to selectively hold the second sun gear against rotation.

In at least one approach, the gearing assembly includes aa second planetary gearset having a second sun gear selectively coupled to the intermediate shaft, a second planetary carrier assembly selectively coupled to the intermediate shaft, and a second ring gear fixedly coupled to the output shaft. In this approach, the gearing assembly may further include a third planetary gearset having a third sun gear fixedly coupled to the second sun gear, a third planetary carrier assembly fixedly coupled to the output shaft, and a third ring gear. The gearing assembly may further include a first brake configured to selectively hold the second planetary carrier assembly against rotation, and a second brake configured to selectively hold the third ring gear against rotation. The gearing assembly may further include a third brake configured to selectively hold the second sun gear against rotation.

In at least one approach, the third rotatable element is a rotatable output element driveably connected to an intermediate shaft. The lockup clutch may be adapted to selectively couple two of the first rotatable element, the second rotatable element, and the third rotatable element to sync a speed of the intermediate to a speed of the engine crankshaft.

In at least one approach, a planetary gearset is provided. The planetary gearset may include a planetary carrier assembly fixedly coupled to an engine crankshaft, a sun gear fixedly coupled to the electric machine, and a ring gear driveably connected to an intermediate shaft. The powertrain may further include a lockup clutch configured to selectively couple the sun gear to the planetary carrier assembly, the sun gear to the ring gear, or the ring gear to the planetary carrier assembly.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate at the same speed about the same axis in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate at the same speed about the same axis whenever it is fully engaged and they have different rotational speeds about that axis in at least some other operating condition. Two rotatable elements are driveably connected or coupled if there is a fixed proportional speed relationship between them A shift element that holds a rotating element against rotation by selectively coupling it to a fixed housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Shift elements may be positive engagement devices such as dog clutches or friction devices capable of transmitting torque between elements in the presence of relative rotation. Two elements are coupled if they are either fixedly coupled or selectively coupled.

A gearing arrangement is a collection of gearing elements and shift elements configured to impose specified speed relationships among a set of shafts. A speed relationship is fixedly imposed by a gearing arrangement if it is imposed regardless of the state of any shift elements. A speed relationship is selectively imposed by a gearing arrangement if the speed relationship is imposed only when particular shift elements of the gearing arrangement are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts with predetermined weightings, and iii) when the speeds of the shafts differ, they are constrained to be in the listed order, either increasing or decreasing.

Figure 1:
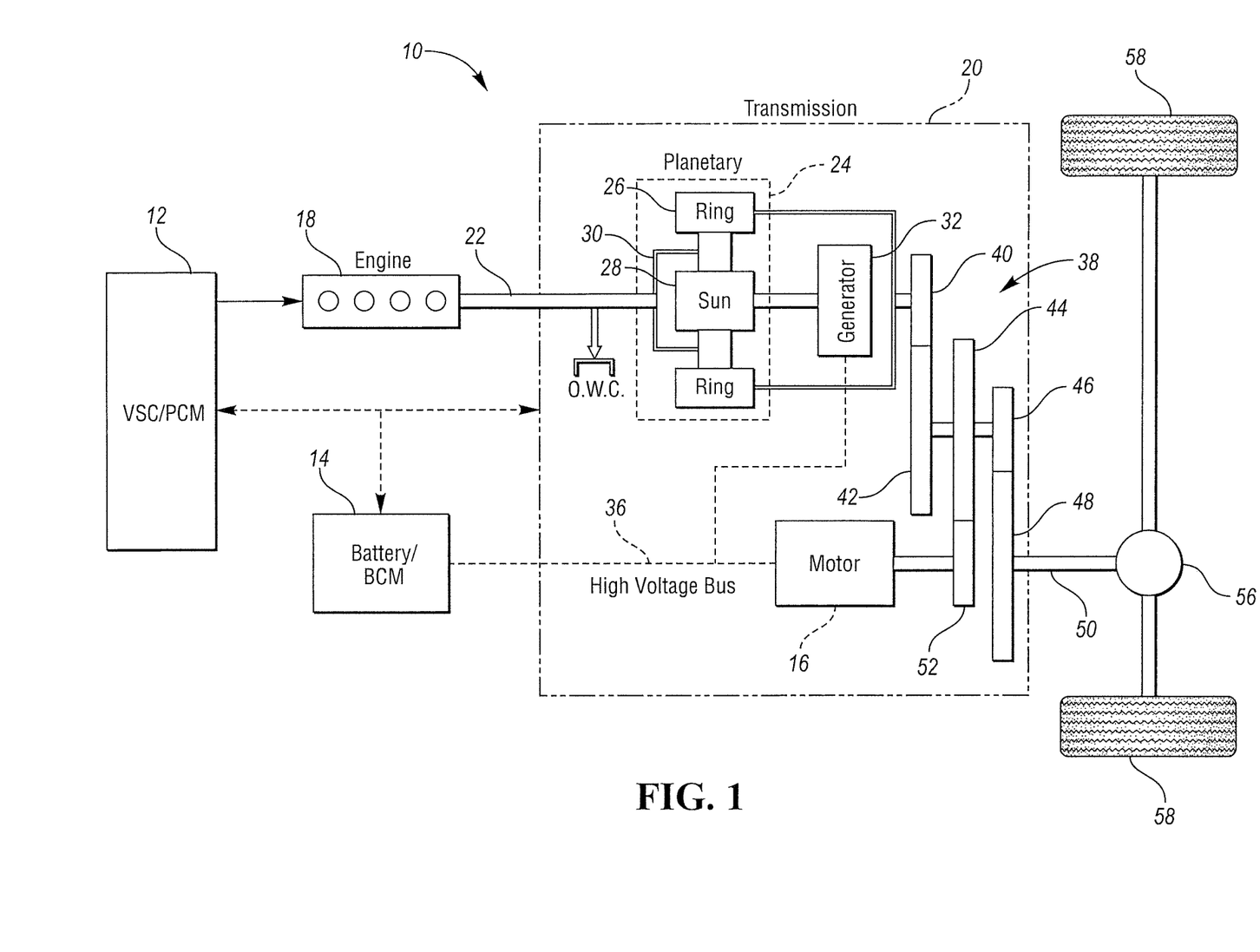
FIG. 1 is a schematic representation of a powersplit powertrain system.

Referring to FIG. 1, a hybrid electric vehicle (HEV) includes a powersplit powertrain 10. The vehicle may include a vehicle system controller (VSC) and powertrain control module (PCM) 12 for controlling an electric traction battery 14. The battery 14 may have a two-way electrical connection, whereby it receives and stores electric energy and also supplies the energy to an electric traction motor 16. The controller 12 may also control the operation of an internal combustion engine (ICE) 18. Both the motor 16 and the engine 18 are capable of powering a transmission 20 that ultimately delivers torque to the wheels of the vehicle.

The engine 18 delivers power to a torque input shaft, such as crankshaft 22, that is connected to a planetary gear set 24, for example, through a one way clutch. The crankshaft 22 powers the planetary gear set 24 that includes a ring gear 26, a sun gear 28, and a planetary carrier assembly 30. The crankshaft 22 is driveably connected to the carrier assembly 30 to power the planetary gear set 24. The planetary gear set 24 may distribute torque to an intermediary shaft 34.

The sun gear 28 is driveably connected to a generator 32. The generator 32 may be engaged with the sun gear 28, such that the generator 32 may either rotate with the sun gear 28, or not rotate with it. When the one way clutch couples the engine 18 to the planetary gear set 24, the generator 32 generates energy as a reactionary element to the operation of the planetary gear set 24. Electric energy generated from the generator 32 may be transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36.

The vehicle may be powered by the engine 18 alone, by the battery 14 and motor 16 alone, or by a combination of the engine 18 with the battery 14 and motor 16. In a first mode of operation, the engine 18 is activated to deliver torque through the planetary gear set 24. The ring gear 26 may distribute torque through the intermediary shaft 34 to step ratio gears 38, which may, for example, comprise meshing gear elements 40, 42, 44, and 46. Gears 42, 44, and 46 are mounted on a countershaft, and gear 46 distributes torque to gear 48. Gear 48 then distributes torque to a torque output shaft or countershaft 50. In the first mode of operation, the motor 16 may also be activated to assist in the engine 18. When the motor 16 is active in assisting, gear 52 distributes torque to gear 44 and to the countershaft.

In a second mode of operation, or EV mode, the engine 18 is disabled or otherwise prevented from distributing torque to the torque output shaft 50. In the second mode of operation, the battery 14 powers the motor 16 to distribute torque through the step ratio gears 38 and to the torque output shaft 50.

The torque output shaft 50 is connected to a differential and axle mechanism 56 which distributes torque to traction wheels 58. The controller 12 controls the battery 14, engine 18, motor 16 and generator 32 in order to distribute torque to the wheels 58 in either the first mode of operation or the second mode of operation.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

Figure 2:
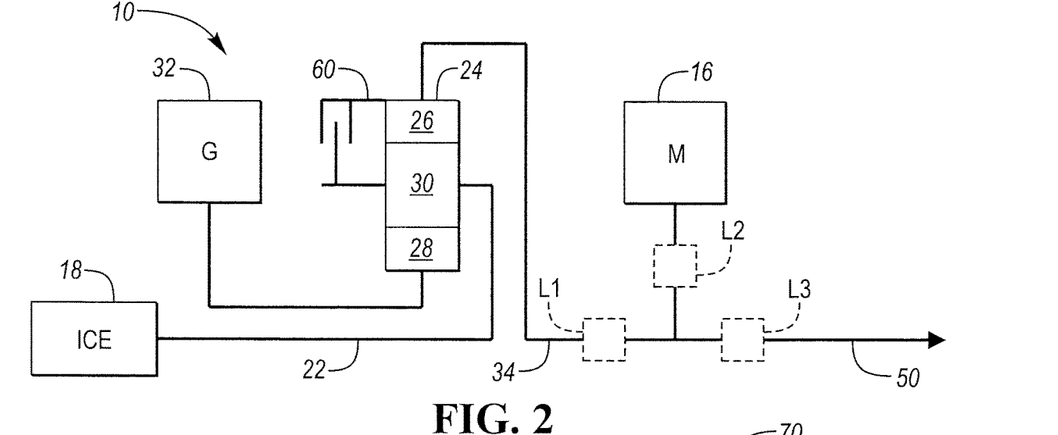
FIG. 2 is a schematic representation of a powersplit powertrain system including a lockup clutch.
Figure 3:
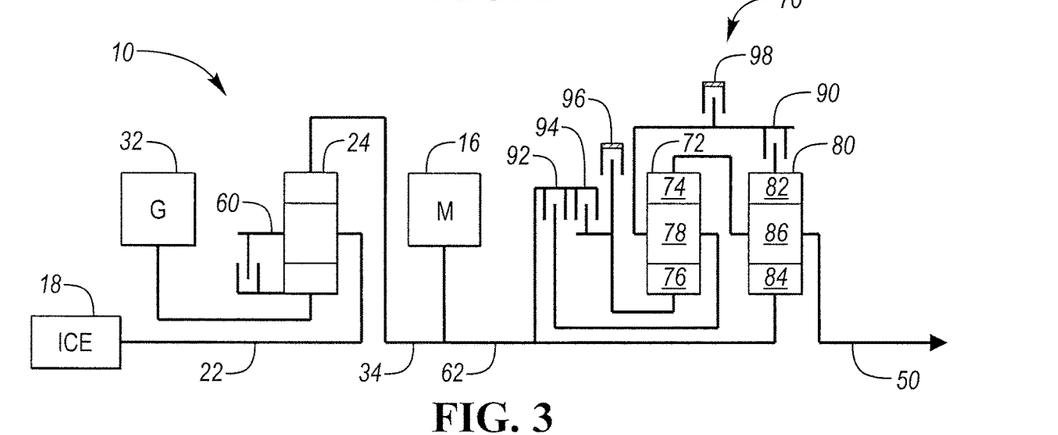
FIG. 3 is a schematic representation of a first transmission gearing arrangement.
Figure 4:
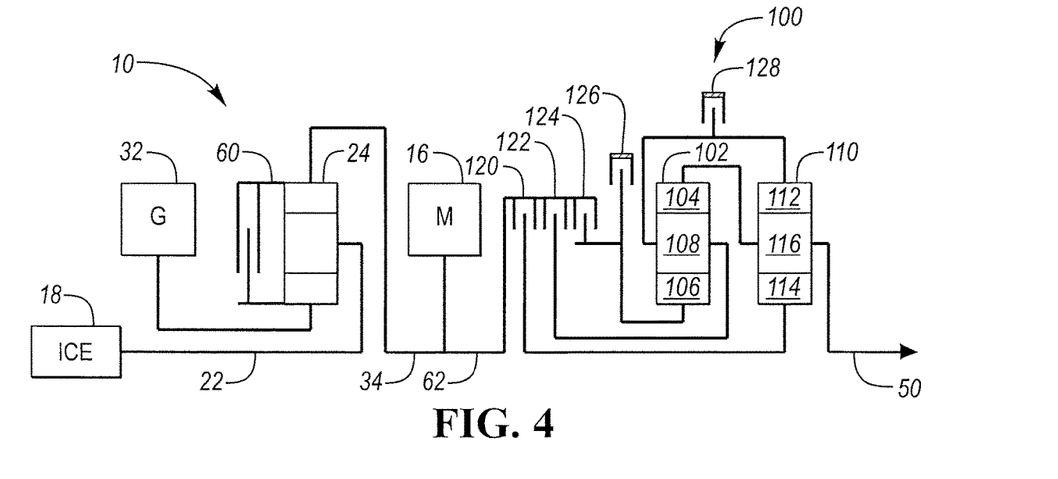
FIG. 4 is a schematic representation of a second transmission gearing arrangement.

Referring now to FIGS. 2-4, the powertrain 10 may further include a lockup clutch 60. The lockup clutch 60 may be adapted to lock up the planetary gear set 24 of the transmission 20. In at least one approach, shown in FIG. 2, the lockup clutch 60 is adapted to lock the ring gear 26 and the planetary carrier assembly 30. In at least one other approach, shown in FIG. 3, the lockup clutch 60 is adapted to lock the sun gear 28 and the planetary carrier assembly 30. In at least one other approach, shown in FIG. 4, the lockup clutch 60 is adapted to lock the ring gear 26 and the sun gear 28.

Lockup of the planetary gear set 24 by the lockup clutch 60 causes the gears of the ring gear 26, sun gear 28, and planetary carrier 30 to mesh and "lock up," thus transmitting torque from the engine 18 to the transmission 20. In this way, the elements of the planetary gear set 24 rotate in unison with a 1 to 1 speed ratio. Lockup of the planetary gear set 24 by the lockup clutch 60 may reduce or eliminate mesh loss in the planetary gear set 24, thereby improving transmission efficiency when in the locked-up configuration.

The transmission 20 may include a gearing-arrangement that may be disposed, for example, at location L1, location L2, or location L3.

Referring now to FIG. 3, a first gearing-arrangement 70 may include a first planetary gear set 72 that includes a ring gear 74, a sun gear 76, and a planetary carrier assembly 78. The first gearing-arrangement 70 may include a second planetary gear set 80 that includes a ring gear 82, a sun gear 84, and a planetary carrier assembly 86.

In at least one approach, the sun gear 76 is selectively coupled to an input 62 by clutch 94. In at least another approach, the first gearing-arrangement 70 does not include clutch 94. In this way, the first gearing-arrangement 70 may provide four forward speeds without a reverse clutch.

Brake 96 selectively couples sun gear 76 to a housing to selectively hold it against rotation. The planetary carrier assembly 78 is selectively coupled to the input 62 by clutch 92. The planetary carrier assembly 78 is also selectively coupled to ring gear 82 by clutch 90. Ring gear 74 is fixedly coupled to planetary carrier assembly 86. The planetary carrier assembly 86 is fixedly coupled to output 50. Sun gear 84 is fixedly coupled to the input 62.

In at least one approach, the first gearing-arrangement 70 does not include clutch 94 or brake 98. In this way, the first gearing-arrangement 70 may provide three forward speeds without a reverse clutch.

Various power flow paths between input shaft 62 and output shaft 50 are established by the selective engagement of the clutches and brakes of the first gearing-arrangement 70. As shown in Table 1, engaging the shift elements in combinations of two or three establishes four forward speed ratios and one reverse speed ratio between input 62 and output 50. An X indicates that the shift element is required to establish the power transfer path. An (X) indicates that the shift element may be engaged in that speed ratio but is not required to establish the power transfer path.

TABLE 1

|     | 90 | 92 | 94  | 96 | 98 | Ratio | Step |
|-----|----|----|-----|----|----|-------|------|
| 1st | X  |    |     |    | X  | 3.00  |      |
| 2nd | X  |    |     | X  |    | 1.67  | 1.80 |
| 3rd | X  | X  | (X) |    |    | 1.00  | 1.67 |
| 4th |    | X  |     | X  |    | 0.67  | 1.50 |
| Rev |    |    | X   |    | X  | −2.00 | 67%  |

Referring now to FIG. 4, a second gearing-arrangement 100 may include a first planetary gear set 102 that includes a ring gear 104, a sun gear 106, and a planetary carrier assembly 108. The second gearing-arrangement 100 may include a second planetary gear set 110 that includes a ring gear 112, a sun gear 114, and a planetary carrier assembly 116.

In at least one approach, the sun gear 106 is selectively coupled to an input 62 by clutch 124. In at least another approach, the second gearing-arrangement 100 does not include clutch 124. In this way, the second gearing-arrangement 100 may provide four forward speeds without a reverse clutch.

Brake 126 selectively couples sun gear 106 to a housing to selectively hold it against rotation. The planetary carrier assembly 108 is selectively coupled to the input 62 by clutch 122. The planetary carrier assembly 108 is fixedly coupled to ring gear 112. Brake 128 selectively couples the planetary carrier assembly 108 and ring gear 112 to the housing to selectively hold them against rotation. Ring gear 104 is fixedly coupled to planetary carrier assembly 116. The planetary carrier assembly 116 is fixedly coupled to output 50. Sun gear 114 is selectively coupled to the input 62 by clutch 120.

In at least one approach, the second gearing-arrangement 100 does not include clutch 124 or brake 128. In this way, the second gearing-arrangement 100 may provide three forward speeds without a reverse clutch.

Various power flow paths between input shaft 62 and output shaft 50 are established by the selective engagement of the clutches and brakes of the second gearing-arrangement 100. As shown in Table 2, engaging the shift elements in combinations of two or three establishes four forward speed ratios and one reverse speed ratio between input 62 and output 50. An X indicates that the shift element is required to establish the power transfer path. An (X) indicates that the shift element may be engaged in that speed ratio but is not required to establish the power transfer path.

TABLE 2

|     | 120 | 122 | 124 | 126 | 128 | Ratio | Step |
|-----|-----|-----|-----|-----|-----|-------|------|
| 1st | X   |     |     |     | X   | 3.00  |      |
| 2nd | X   |     |     | X   |     | 1.67  | 1.80 |
| 3rd | X   | X   | (X) |     |     | 1.00  | 1.67 |
| 4th |     | X   |     | X   |     | 0.67  | 1.50 |
| Rev |     |     | X   |     | X   | −2.00 | 67%  |

Figure 5:
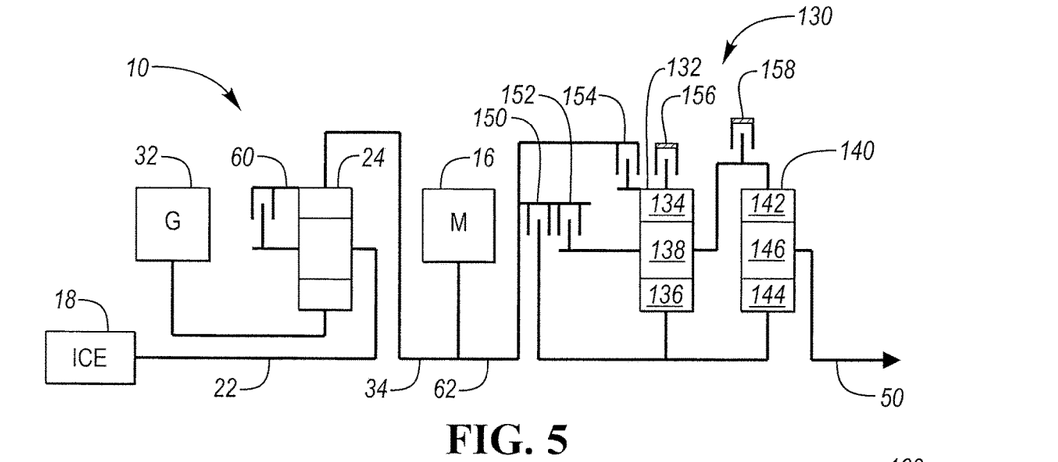
FIG. 5 is a schematic representation of a third transmission gearing arrangement.

Referring now to FIG. 5, a third gearing-arrangement 130 may include a first planetary gear set 132 that includes a ring gear 134, a sun gear 136, and a planetary carrier assembly 138. The third gearing-arrangement 130 may include a second planetary gear set 140 that includes a ring gear 142, a sun gear 144, and a planetary carrier assembly 146.

Sun gear 136 is selectively coupled to an input 62 by clutch 150. Sun gear 136 is fixedly coupled to sun gear 144. The planetary carrier assembly 138 is selectively coupled to the input 62 by clutch 152. The planetary carrier assembly 138 is fixedly coupled to ring gear 142. Brake 158 selectively couples the planetary carrier assembly 138 and ring gear 112 to a housing to selectively hold them against rotation.

In at least one approach, the ring gear 134 is selectively coupled to the input 62 by clutch 154. In at least another approach, the third gearing-arrangement 130 does not include clutch 154. In this way, the third gearing-arrangement 130 may provide four forward speeds without a reverse clutch.

Brake 156 selectively couples ring gear 136 to the housing to selectively hold it against rotation. The planetary carrier assembly 146 is fixedly coupled to output 50.

In at least one approach, the third gearing-arrangement 130 does not include clutch 154 or brake 158. In this way, the third gearing-arrangement 130 may provide three forward speeds without a reverse clutch.

Various power flow paths between input shaft 62 and output shaft 50 are established by the selective engagement of the clutches and brakes of the third gearing-arrangement 130. As shown in Table 3, engaging the shift elements in combinations of two or three establishes four forward speed ratios and one reverse speed ratio between input 62 and output 50. An X indicates that the shift element is required to establish the power transfer path. An (X) indicates that the shift element may be engaged in that speed ratio but is not required to establish the power transfer path.

TABLE 3

|     | 150 | 152 | 154 | 156 | 158 | Ratio | Step |
|-----|-----|-----|-----|-----|-----|-------|------|
| 1st | X   |     |     |     | X   | 3.00  |      |
| 2nd | X   |     |     | X   |     | 1.67  | 1.80 |
| 3rd | X   | X   | (X) |     |     | 1.00  | 1.67 |
| 4th |     | X   |     | X   |     | 0.67  | 1.50 |
| Rev |     |     | X   |     | X   | −2.00 | 67%  |

Figure 6:
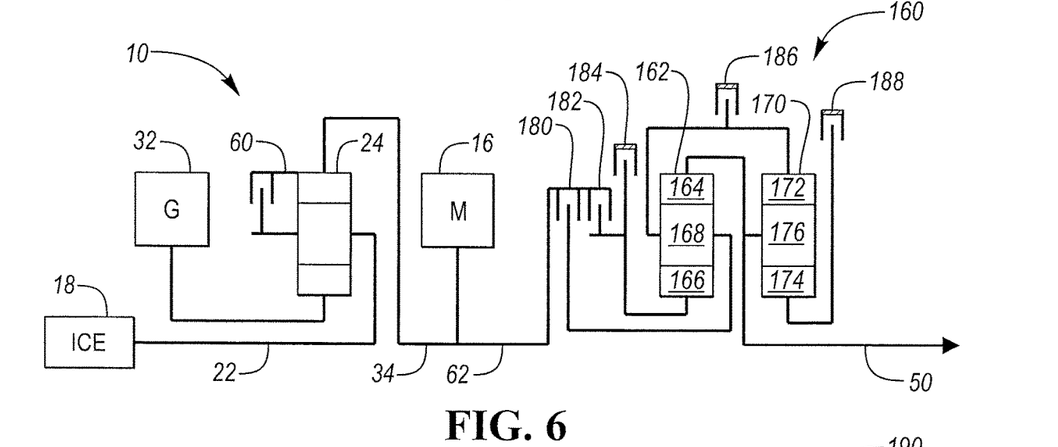
FIG. 6 is a schematic representation of a fourth transmission gearing arrangement.

Referring now to FIG. 6, a fourth gearing-arrangement 160 may include a first planetary gear set 162 that includes a ring gear 164, a sun gear 166, and a planetary carrier assembly 168. The fourth gearing-arrangement 160 may include a second planetary gear set 170 that includes a ring gear 172, a sun gear 174, and a planetary carrier assembly 176.

Sun gear 166 is selectively coupled to an input 62 by clutch 182. Brake 184 selectively couples sun gear 166 to a housing to selectively hold it against rotation. The planetary carrier assembly 168 is selectively coupled to the input 62 by clutch 180. The planetary carrier assembly 168 is fixedly coupled to ring gear 172.

In at least one approach, a brake 186 selectively couples the planetary carrier assembly 168 and ring gear 172 to the housing to selectively hold them against rotation. In at least another approach, the fourth gearing-arrangement 160 does not include brake 186. In this way, the fourth gearing-arrangement 160 may provide four forward speeds without a reverse clutch.

Ring gear 164 is fixedly coupled to the planetary carrier assembly 176. Ring gear 164 and the planetary carrier assembly 176 are fixedly coupled to the output 50. Brake 186 selectively couples sun gear 174 to the housing to selectively hold it against rotation.

In at least one approach, the fourth gearing-arrangement 160 does not include brake 184 or brake 186. In this way, the fourth gearing-arrangement 160 may provide three forward speeds without a reverse clutch.

Various power flow paths between input shaft 62 and output shaft 50 are established by the selective engagement of the clutches and brakes of the third gearing-arrangement 130. As shown in Table 4, engaging the shift elements in combinations of two or three establishes four forward speed ratios and one reverse speed ratio between input 62 and output 50. An X indicates that the shift element is required to establish the power transfer path. An (X) indicates that the shift element may be engaged in that speed ratio but is not required to establish the power transfer path.

TABLE 4

|     | 180 | 182 | 184 | 186 | 188 | Ratio | Step |
|-----|-----|-----|-----|-----|-----|-------|------|
| 1st |     | X   |     |     | X   | 3.00  |      |
| 2nd | X   |     |     |     | X   | 1.67  | 1.80 |
| 3rd | X   | X   |     |     |     | 1.00  | 1.67 |
| 4th | X   |     | X   |     |     | 0.67  | 1.50 |
| Rev |     | X   |     | X   |     | -2.00 | 67%  |

Figure 7:
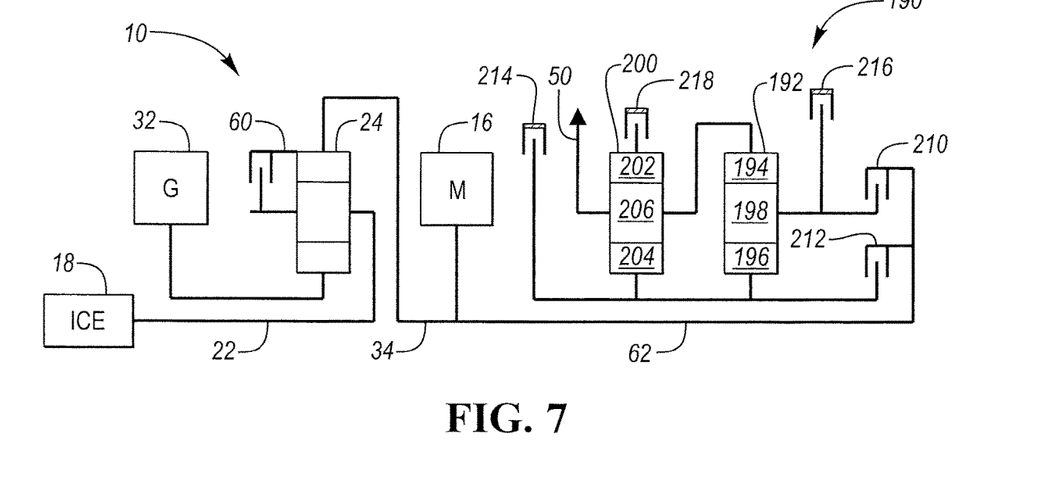
FIG. 7 is a schematic representation of a fifth transmission gearing arrangement.

Referring now to FIG. 7, a fifth gearing-arrangement 190 may include a first planetary gear set 192 that includes a ring gear 194, a sun gear 196, and a planetary carrier assembly 198. The fifth gearing-arrangement 190 may include a second planetary gear set 200 that includes a ring gear 202, a sun gear 204, and a planetary carrier assembly 206.

Sun gear 196 is selectively coupled to an input 62 by clutch 212. Sun gear 196 is fixedly coupled to sun gear 204. Brake 214 selectively couples sun gear 196 and sun gear 204 to a housing to selectively hold them against rotation. The planetary carrier assembly 198 is selectively coupled to the input 62 by clutch 210.

In at least one approach, a brake 216 selectively couples the planetary carrier assembly 198 to the housing to selectively hold it against rotation. In at least another approach, the fifth gearing-arrangement 190 does not include brake 216. In this way, the fifth gearing-arrangement 190 may provide four forward speeds without a reverse clutch.

Ring gear 194 is fixedly coupled to the planetary carrier assembly 206. The planetary carrier assembly 206 is fixedly coupled to output 50. Brake 218 selectively couples ring gear 202 to the housing to selectively hold it against rotation.

In at least one approach, the fifth gearing-arrangement 190 does not include brake 214 or brake 216. In this way, the fifth gearing-arrangement 190 may provide three forward speeds without a reverse clutch.

Various power flow paths between input shaft 62 and output shaft 50 are established by the selective engagement of the clutches and brakes of the third gearing-arrangement 130. As shown in Table 5, engaging the shift elements in combinations of two or three establishes four forward speed ratios and one reverse speed ratio between input 62 and output 50. An X indicates that the shift element is required to establish the power transfer path. An (X) indicates that the shift element may be engaged in that speed ratio but is not required to establish the power transfer path.

TABLE 5

|     | 210 | 212 | 214 | 216 | 218 | Ratio | Step |
|-----|-----|-----|-----|-----|-----|-------|------|
| 1st |     | X   |     |     | X   | 3.00  |      |
| 2nd | X   |     |     |     | X   | 1.67  | 1.80 |
| 3rd | X   | X   |     |     |     | 1.00  | 1.67 |
| 4th | X   |     | X   |     |     | 0.67  | 1.50 |
| Rev |     | X   |     | X   |     | -2.00 | 67%  |

TABLE 5-continued

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A powertrain comprising:
   an engine;
   an electric machine;
   a planetary gearset including a planetary carrier assembly fixedly coupled to an engine crankshaft, a sun gear fixedly coupled to the electric machine, and a ring gear driveably connected to an intermediate shaft;
   a lockup clutch configured to selectively couple two of the planetary carrier assembly, the sun gear, and the ring gear;
   a second electric machine driveably connected to the intermediate shaft;
   a gearing assembly configured to alternately selectively establish a plurality of proportional speed relationships between the intermediate shaft and an output shaft;
   a second planetary gearset having a second sun gear, a second planetary carrier assembly, and a second ring gear fixedly coupled to the output shaft;
   a third planetary gearset having a third sun gear fixedly coupled to the intermediate shaft, a third planetary carrier assembly fixedly coupled to the output shaft, and a third ring gear selectively coupled to the second planetary carrier assembly;
   a first brake configured to selectively hold the second sun gear against rotation; and
   a second brake configured to selectively hold the second planetary carrier assembly against rotation.

2. The powertrain of claim 1 wherein the plurality of proportional speed relationships includes four positive speed relationships and one negative speed relationship.

3. The powertrain of claim 1 wherein the second sun gear is selectively coupled to the intermediate shaft.

4. The powertrain of claim 1 wherein the gearing assembly further comprises:

a clutch configured to selectively couple the intermediate shaft to the second planetary carrier assembly.

5. A powertrain comprising:
an engine;
an electric machine;
a planetary gearset including a planetary carrier assembly fixedly coupled to an engine crankshaft, a sun gear fixedly coupled to the electric machine, and a ring gear driveably connected to an intermediate shaft;
a lockup clutch configured to selectively couple two of the two of the planetary carrier assembly, the sun gear, and the ring gear;
a second electric machine driveably connected to the intermediate shaft; and
a gearing assembly configured to alternately selectively establish a plurality of proportional speed relationships between the intermediate shaft and an output shaft;
a second planetary gearset having a second sun gear, a second planetary carrier assembly, and a second ring gear fixedly coupled to the output shaft;
a third planetary gearset having a third sun gear selectively coupled to the intermediate shaft, a third planetary carrier assembly fixedly coupled to the output shaft, and a third ring gear fixedly coupled to the second planetary carrier assembly;
a first brake configured to selectively hold the second sun gear against rotation; and
a second brake configured to selectively hold the second planetary carrier assembly against rotation.

6. The powertrain of claim 5 wherein the second sun gear is selectively coupled to the intermediate shaft.

7. The powertrain of claim 5 wherein the gearing assembly further comprises:
a clutch configured to selectively couple the intermediate shaft to the second planetary carrier assembly.

8. A powertrain comprising:
an engine;
an electric machine;
a planetary gearset including a planetary carrier assembly fixedly coupled to an engine crankshaft, a sun gear fixedly coupled to the electric machine, and a ring gear driveably connected to an intermediate shaft;
a lockup clutch configured to selectively couple two of the two of the planetary carrier assembly, the sun gear, and the ring gear;
a second electric machine driveably connected to the intermediate shaft; and
a gearing assembly configured to alternately selectively establish a plurality of proportional speed relationships between the intermediate shaft and an output shaft;
a second planetary gearset having a second sun gear selectively coupled to the intermediate shaft, a second planetary carrier assembly, and a second ring gear;
a third planetary gearset having a third sun gear fixedly coupled to the second sun gear, a third planetary carrier assembly fixedly coupled to the output shaft, and a third ring gear fixedly coupled to the second planetary carrier assembly;
a first brake configured to selectively hold the second ring gear against rotation; and
a second brake configured to selectively hold the third ring gear against rotation.

9. The powertrain of claim 8 wherein the second ring gear is selectively coupled to the intermediate shaft.

10. The powertrain of claim 8 wherein the gearing assembly further comprises:
a clutch configured to selectively couple the intermediate shaft to the second planetary carrier assembly.

11. A powertrain comprising:
an engine;
an electric machine;
a planetary gearset including a planetary carrier assembly fixedly coupled to an engine crankshaft, a sun gear fixedly coupled to the electric machine, and a ring gear driveably connected to an intermediate shaft;
a lockup clutch configured to selectively couple two of the two of the planetary carrier assembly, the sun gear, and the ring gear;
a second electric machine driveably connected to the intermediate shaft; and
a gearing assembly configured to alternately selectively establish a plurality of proportional speed relationships between the intermediate shaft and an output shaft;
a second planetary gearset having a second sun gear selectively coupled to the intermediate shaft, a second planetary carrier assembly selectively coupled to the intermediate shaft, and a second ring gear fixedly coupled to the output shaft;
a third planetary gearset having a third sun gear, a third planetary carrier assembly fixedly coupled to the output shaft, and a third ring gear fixedly coupled to the second planetary carrier assembly; and
a first brake configured to selectively hold the third sun gear against rotation.

12. The powertrain of claim 11 wherein the gearing assembly further comprises:
a second brake configured to selectively hold the second planetary carrier assembly against rotation.

13. The powertrain of claim 11 wherein the gearing assembly further comprises:
a third brake configured to selectively hold the second sun gear against rotation.

14. A powertrain comprising:
an engine;
an electric machine;
a planetary gearset including a planetary carrier assembly fixedly coupled to an engine crankshaft, a sun gear fixedly coupled to the electric machine, and a ring gear driveably connected to an intermediate shaft;
a lockup clutch configured to selectively couple two of the planetary carrier assembly, the sun gear, and the ring gear;
a second electric machine driveably connected to the intermediate shaft; and
a gearing assembly configured to alternately selectively establish a plurality of proportional speed relationships between the intermediate shaft and an output shaft;
a second planetary gearset having a second sun gear selectively coupled to the intermediate shaft, a second planetary carrier assembly selectively coupled to the intermediate shaft, and a second ring gear fixedly coupled to the output shaft;
a third planetary gearset having a third sun gear fixedly coupled to the second sun gear, a third planetary carrier assembly fixedly coupled to the output shaft, and a third ring gear; and
a first brake configured to selectively hold the third ring gear against rotation.

15. The powertrain of claim 14 wherein the gearing assembly further comprises:
a second brake configured to selectively hold the second planetary carrier assembly against rotation.

16. The powertrain of claim 14 wherein the gearing assembly further comprises:
   a third brake configured to selectively hold the second sun gear against rotation.

\* \* \* \* \*